United States Patent

[11] 3,629,013

| [72] | Inventor | Kenneth B. Stokes<br>Minneapolis, Minn. |
|---|---|---|
| [21] | Appl. No. | 804,005 |
| [22] | Filed | Mar. 3, 1969 |
| [45] | Patented | Dec. 21, 1971 |
| [73] | Assignee | General Mills, Inc. |

[54] NITROCELLULOSE COATINGS IMPROVED BY CERTAIN POLYISOCYANATES AND ALDIMINE OR KETIMINE BLOCKED POLYAMINES
11 Claims, No Drawings

[52] U.S. Cl. ................................................. 148/6.15,
117/124 E, 117/132 B, 117/138.8 A, 117/148,
117/161 C, 117/161 KP, 117/161 UT, 117/161
UN, 148/31.5

[51] Int. Cl. ............................................ B44d 1/36,
C23f 17/00

[50] Field of Search ............................................ 117/132 B,
126 AR, 138.8 A, 148, 132 C, 124 E, 161 C, 161
KP, 161 UT, 161 UN; 260/29.1, 13; 148/6.15,
31.5

[56] References Cited
UNITED STATES PATENTS

| 1,942,926 | 1/1934 | Jenkins | 260/13 |
|---|---|---|---|
| 2,168,040 | 8/1939 | Nebel | 260/13 UX |
| 2,294,479 | 9/1942 | Peter | 117/132 UX |
| 2,774,745 | 12/1956 | Hedlund | 260/13 X |
| 3,055,851 | 9/1962 | Sanderson | 117/132 X |
| 3,196,039 | 7/1965 | Herbst et al. | 148/6.15 X |
| 3,318,971 | 5/1967 | Chloupek et al. | 117/132 X |
| 3,411,941 | 11/1968 | Lowe et al. | 117/132 X |
| 3,450,563 | 6/1969 | Krueger | 117/132 X |
| 3,475,356 | 10/1969 | Davis et al. | 260/13 |
| 3,507,817 | 4/1970 | Molotsky et al. | 117/132 X |

*Primary Examiner*—William D. Martin
*Assistant Examiner*—Harry J. Gwinnell
*Attorneys*—Anthony A. Juettner, William C. Babcock and Gene O. Enockson

ABSTRACT: Coatings are prepared from compositions comprising nitrocellulose, polyisocyanates derived from polymeric fat acids and aldimine or ketimine blocked aliphatic polyamines having no unreacted secondary amine groups.

NITROCELLULOSE COATINGS IMPROVED BY CERTAIN POLYISOCYANATES AND ALDIMINE OR KETIMINE BLOCKED POLYAMINES

The present invention relates to improved nitrocellulose coatings and the process of preparing such coatings. More particularly, it relates to the improvement of nitrocellulose coatings through the use of polymeric fat acid based isocyanates and certain ketimine or aldimine blocked polyamines including derivatives thereof.

Conventional nitrocellulose lacquers have low impact resistance and are soluble in many solvents. By incorporating certain isocyanates in the system, coatings based on toluene wet nitrocellulose have improved solvent resistance because of cross-linking. Impact resistance is not necessarily improved, however. Furthermore, with certain isocyanates, an undesirable induction period is required before the coating can be employed.

I have now discovered that nitrocellulose coatings can be prepared using polyisocyanates derived from polymeric fat acids to improve certain characteristics of the coating while reducing the induction period and/or further improving the properties of the coatings in various respects, particularly the impact resistance thereof. These latter improvements are obtained in accordance with the present invention by the use of certain aldimine or ketimine blocked aliphatic polyamines or derivatives thereof.

The nitrocellulose employed in this invention is not limited to a particular grade or type, but can be any type generally suitable for the preparation of nitrocellulose coating compositions. It is, however, preferred to use toluene wet nitrocellulose (11.8–12.2 percent nitrogen) having a viscosity of one-fourth second, one-half second or 5–6 seconds. It is especially preferred to employ one-fourth and/or one-half second RS nitrocellulose.

As indicated above, the polyisocyanates employed in the present invention are derived from polymeric fat acids and have the following idealized structural formula:

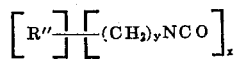

where y is 0 or 1, x is an integer of 2 to about 4 and R'' is the hydrocarbon group of polymeric fat acids. Preferably x is 2. The polyisocyanates of the above formula wherein y is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

3D(COOH)$_2$cyz2PCl$_3$ ⟶ 3D(COCl)$_2$+2H$_3$PO$_3$

D(COCl)$_2$+2NaN$_3$ ⟶ D(CON$_3$)$_2$+2NaCl

D(CON$_3$)$_2$ ⟶$_\triangle$ D(NCO)$_2$+2N$_2$

The polyisocyanates wherein y is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. This method of preparation can be conveniently illustrated by the following equations (using a dimeric fat acid as an example):

D(COOH)$_2$+c2NH$_3$ ⟶ D(CN)$_2$+4H$_2$O

D(CN)$_2$+H$_2$ $\xrightarrow[\text{catalyst}]{\text{NH}_3}$ D(CH$_2$NH)$_2$

D(CH$_2$NH$_2$)$_2$+COCl$_2$ ⟶ D(CH$_2$NCO)$_2$+2HCl

The polymeric fat acids, useful as the starting materials for preparing the above polyisocyanates, are prepared by polymerizing ethylenically unsaturated monobasic carboxylic acids having 16 to 22 carbon atoms or the lower alkyl esters thereof. The preferred aliphatic acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14-octadecatrienoic (pseudo eleostearic) and the like. A representative 18 carbon atom acid having more than three double bonds is moroctic acid which is indicated to be 4,8,12,15-octadecatetraienoic acid. Representative of the less preferred (not as readily available commercially) acids are:

7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can be polymerized using known catalytic or noncatalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the nonconjugated positions. Clay catalysts are commonly used to accelerate the polymerization of the unsaturated acids. Lower temperatures are generally used when a catalyst is employed.

The polyisocyanate derived from these dimeric fat radicals and trimeric fat radicals may be referred to hereinafter by the names dimeryl isocyanate and trimeryl isocyanate. These materials may be produced from mixtures of dimer and trimer fat acid and the relative quantities may be controlled by the degree to which the individual compounds have been isolated in preparing the dimer and trimer fat acids.

The aldimine or ketimine blocked polyamines useful in the present invention are prepared from aliphatic polyamines having at least two primary amine groups. The reaction of carbonyl compounds with the primary amine groups of the polyamines can be illustrated as follows:

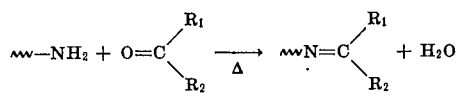

The useful carbonyl compounds may have the following structural formula

where R$_1$ and R$_2$ are hydrogen or organic radicals with the proviso that at least one of the same must be an organic radical. When organic, the radicals are preferably short chain alkyl groups (one to six carbon atoms) or the phenyl group. Preferred carbonyl compounds are low molecular weight (C$_2$–C$_8$) aldehydes or ketones that are volatile so that an unreacted excess thereof may easily be removed by conventional distillation practices when the reaction is completed or as it proceeds.

Preferred examples of the carbonyl compounds include such aldehydes and ketones as acetone, methylethyl ketone, diethyl ketone, methylisopropyl ketone, methylisobutyl ketone, methyl-n-butyl ketone, methyl-tert-butyl ketone, ethylisopropyl ketone, acetaldehyde, benzaldehyde, propionaldehyde, butyraldehyde, isobutyraldehyde, and the like (i.e., including hexanone and hexanal). An especially preferred compound is methylisobutyl ketone (i.e.,—

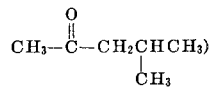

Preferred aliphatic polyamines are those having the structures:

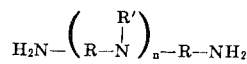

or

where R is a difunctional aliphatic group containing from two to 48 carbon atoms, R' is an aliphatic group containing one to 24 carbon atoms and n is an integer of from zero to 20. Representative R radicals are ethylene, propylene, trimethylene, butylene, pentylene, hexamethylene, octylene, octadecylene, polyoxyalkylene $-(R'''-O)_c-R'''-$ where $R'''$ is an alkylene group of two to six carbon atoms and c is an integer of one to about 35, and the like. Representative R' radicals zero to methyl, ethyl, propyl, butyl, decyl, hexadecyl, hexenyl, octenyl, tridecenyl, octadecyl, undecynyl and the like. Inert or noninterfering groups such as Cl, nitro and the like may be present on R and/or R'. Illustrative of the preferred compounds are the following alkylene polyamines: ethylene diamine, hexamethylene diamine, diethylene triamine, triethylene tetraamine, dipropylene triamine, tris(2-aminoethyl)amine and mixed polyalkylene polyamines, such as N,N'-bis(gamma-aminopropyl)-ethylene diamine. Especially preferred compounds are those wherein R is a short chain alkylene group of two to six carbon atoms and n is two or less.

Where the ketimine or aldimine blocked polyamines contain secondary amine groups, such groups are inactivated by reaction with carboxylic acids, isocyanates or other reactants for groups. It is a preferred embodiment of the invention to use isocyanate derivatives of the aldimine or ketimine blocked polyamines containing a secondary amine group or groups.

Typical polyisocyanates which may be used in preparing such derivatives include the polymethylene diisocyanates such as ethylenediisocyanate, trimethylenediisocyanate, tetramethylenediisocyanate, pentamethylenediisocyanate, hexamethylenediisocyanate, etc.; other alkylene diisocyanates, such as propylene-1,2-diisocyanate, butylene-1,2-diisocyanate, butylene-1,3-diisocyanate, butylene-2,3-diisocyanate, etc.; alkylidene diisocyanates, such as ethylidene diisocyanate, butylidene diisocyanate, etc.; cycloalkylene diisocyanates, such as cyclopentylene-1,3-diisocyanate, cyclohexylene-1,4-diisocyanate, 4,4'-diisocyanato bis(cyclohexyl)methane, etc.; cycloalkylidene diisocyanates such as cyclopentylidene diisocyanate, cyclohexylidene diisocyanate, etc.; triisocyanates such as 1,2,4-butanetriisocyanate, 1,3,3-pentanetriisocyanate, 1,2,2-butanetriisocyanate, etc.

Examples of araliphatic polyisocyanates which may be used in preparing the derivatives include the following:
p-phenylene 2,2'-bis(ethyl isocyanate), p-phenylene-3,3'-bis(propyl isocyanate), p-phenylene-4,4'-bis(butyl isocyanate), m-phenylene-2,2'-bis(ethyl isocyanate, 1,4-naphthalene-2,2'-bis(ethyl isocyanate), 4,4'-diphenylene-2,2'-bis(ethyl isocyanate), 4,4'-diphenylene ether-2,2'-bis(ethyl isocyanate), tris(2,2'''-isocyanatoethyl benzene), 5-chloro phenylene-1,3-bis(propyl-3-isocyanate), 5-methoxy phenylene-1,3-bis(propyl-3-isocyanate), 5-cyano phenylene-1,3-bis(propyl-3-isocyanate) and 5-methyl phenylene-1,3-bis(propyl-3-isocyanate).

Typical aromatic polyisocyanates which may be used include tolylene diisocyanate, m-phenylene diisocyanate, p-phenylene diisocyanate, 1-methyl-2,4-phenylene diisocyanate, naphthylene-1,4-diisocyanate, diphenylene-4,4'-diisocyanate, etc.

Mono-isocyanates may also be employed in preparing the derivatives. Such isocyanates may be aliphatic, cycloaliphatic, aromatic, araliphatic and the like. Representative of same are the following: decyl isocyanate, hexadecyl isocyanate, heptadecyl isocyanate, heneicosyl isocyanate, octadecyl isocyanate, docosyl isocyanate, 9-octadecenyl isocyanate, naphthenic isocyanate derived from bicyclic naphthenic acid—i.e., $C_{20}H_{37}COOH$, and the like.

Preferred organic isocyanates to be employed in preparing the derivatives are the isocyanates having hydrocarbon radicals. Between the mono and polyisocyanates, it is preferred to employ the latter. Particularly preferred compounds are the diisocyanates. Of this class the dimeryl diisocyanates described hereinabove are preferred reactants. Mixtures of the various organic isocyanates may be employed.

The derivatives are prepared by simply mixing the ketimine or aldimine blocked polyamine with the organic isocyanate. Such mixing is preferably carried out in a reaction environment substantially free of moisture. Where desired, the reaction mixture may be heated although the reaction is normally exothermic to a certain extent. The organic isocyanate is used in an amount about equivalent to the equivalents of free secondary amine groups of the polyamine. In this respect, if the polyamine contains one free secondary amine group and the isocyanate is a monoisocyanate, one mole of the polyamine is reacted with 1 mole of the isocyanate. If the polyamine contains two free secondary amine groups and the isocyanate is a monoisocyanate, 1 mole of the polyamine would be reacted with 2 moles of the isocyanate. If the polyamine has one free secondary amine group and the isocyanate is a diisocyanate, 2 moles of the polyamine would be reacted with one mole of the diisocyanate. It is thus apparent that the ratio of reactants varies as to the number of free secondary amine groups of the polyamine—i.e., one, two, three or more—and as to whether the isocyanate is mono, di, tri or higher. The derivative may be prepared in the presence of a solvent or diluent if desired. The reaction of the secondary amine group or groups (i.e.

) of the polyamine with the isocyanate group (i.e.—-NCO) yields a linkage of the following structure:

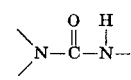

The derivatives are complex materials. In this respect they comprise a residue of a polyamine, two or more (preferably less than about 50) ketimine or aldimine blocked primary amine groups and one or more (preferably less than about 50) urea groups derived from the secondary amine group or groups of the polyamine and the isocyanate compounds. In some of the preferred and simpler aspects, the derivatives can be defined structurally. Thus when the polyamine has only one free secondary amine group and the isocyanate is mono- or difunctional or when the polyamine has more than one free secondary amine group and the isocyanate is monofunctional, the derivatives can be defined by the following idealized, structural formulas I. 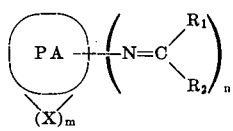

and

II. 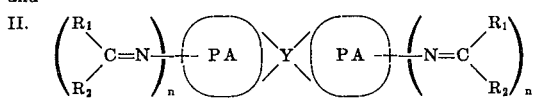

where $R_1$ and $R_2$ are as defined above, n is an integer of at least 2, m is an integer of at least 1,

is the residue of a polyamine exclusive of the ketimine or aldimine blocked primary amine groups and the urea linked secondary amine nitrogen or nitrogens,

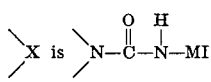

where MI is the residue of a monoisocyanate exclusive of the isocyanato group, and

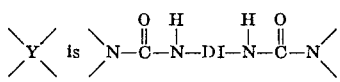

where DI is the residue of a diisocyanate exclusive of the isocyanato groups. Where the polyamine contains two or more secondary amine groups and the isocyanate is di, tri or higher functional, complex mixtures of derivatives tend to be produced. Such mixtures include compounds where two or more polyamine moieties are linked by two or more isocyanate moieties. The derivatives also include those prepared using two or more blocked polyamines and/or two or more different isocyanates.

In addition to the nitrocellulose, polyisocyanate and aldimine or ketimine blocked aliphatic polyamine free of unreacted secondary amine groups, the compositions useful in preparing the coatings in accordance with the present invention also preferably contain a urethane catalyst. A preferred catalyst is dibutyl tin dilaurate. Other useful catalysts of the described type are $Bi(NO_3)_3 \cdot 5H_2O$, ferric acetyl acetonate hydrate, dibutyl tin dichloride, and the like. It is highly desirable to include the catalyst since in the absence thereof, a very long induction period may be necessary before application of the coating composition to the substrate. During such long induction period, the compositions may be hazy or gel, making it difficult or almost impossible to apply the same smoothly to the substrate. Furthermore, the desired degree of cross-linking may not occur in some instances in the absence of the catalyst.

In a conventional manner, the nitrocellulose and other reactants are dissolved in an organic solvent or thinner. Any of the solvents conventionally used in nitrocellulose coating compositions or lacquers may be used provided that they are are free of alcohols or water. Such solvents include ketones such as methyl ethyl ketone, methyl isobutyl ketone and diisobutyl ketone, hydrocarbons such as xylene, toluene and petroleum naphtha, esters such as ethyl acetate and butyl acetate, and the like.

Various other optional additives can be included for their known uses such as dyes, pigments, plasticizers, flow control agents and the like.

The polyisocyanate derived from polymerized fat acids is used in an amount of about 2 to 100 percent based on the weight of the nitrocellulose solids. Preferably the polyisocyanate is used in an amount of about 40 to 100 percent based on the weight of the nitrocellulose. The aldimine or ketimine blocked polyamine component is used in an amount of about 2.0 to 30 percent based on the weight of the nitrocellulose solids, with the proviso that the amount of such component in the composition is always equal to or less than would be required upon the unblocking of the primary amine groups thereof to react with all of the polyisocyanate. The blocked polyamine component is preferably used in an amount of about 10 to 25 percent based on the weight of the nitrocellulose.

The quantity of solvent or thinner is such as to provide a total solids content (i.e., nitrocellulose, polyisocyanate and aldimine or ketimine blocked polyamine) in the range of 5 to 30 percent by weight, and more preferably 15 to 20 percent by weight. The catalyst, when present, is used in catalytic amounts which are preferably 0.1 to 10 percent by weight based on the weight of the nitrocellulose.

The various components can be added to the solvent up to a few hours before use or immediately prior to the application of the resulting coating composition to the substrate to be coated. They can also be added individually to portions of the solvent and then the respective solutions can be mixed. Additionally, the components can be premixed as two compositions and then mixed shortly before application to the substrate. As such the toluene wet nitrocellulose and polyisocyanate can be added to a portion of the solvent and aldimine or ketimine component and catalyst (when used) to the remainder of the solvent.

The coatings are prepared in accordance with the present invention by applying the described compositions to the substrate and then curing such compositions. Application to the substrate can be carried out by any of the conventional procedures including brushing, rolling, spraying, use of bar applicators and the like.

The coatings can be cured by merely exposing same to ambient conditions—i.e., room temperature, atmospheric pressure, normal humidity. Curing can be accelerated by the use of elevated temperatures—i.e., room temperature (25° to 100° C.

The coatings can be applied to a wide variety of substrates including glass, metals, plastics, wood etc. However, the coatings are particularly valuable for wood and phosphatized metals, such as phosphatized steel, since the adhesion to the latter substrates is good to excellent. The cured coatings preferably have a thickness of 0.5 to 5.0 mils.

In the examples to follow, the dimeryl isocyanate employed has the formula

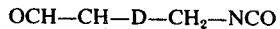

OCH—CH—D—CH$_2$—NCO where D is the divalent hydrocarbon radical of the dimerized fat acids obtained by polymerizing and hydrogenating (in the presence of palladium catalyst) the mixture of fat acids derived from tall oil (composed of approximately 40–45 percent linoleic and 50–55 percent oleic, such percent's being by weight). The ketimine blocked polyamine component used in examples I and II is a derivative of the formula:

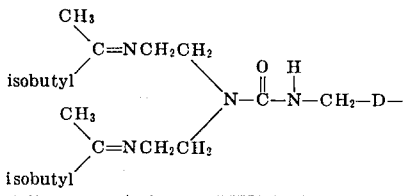

where D is as defined above. Such derivative was prepared by reacting the dimeryl isocyanate with an equivalent amount of the diketimine of diethylene triamine and methylisobutyl ketone.

The examples illustrate certain preferred aspects of the invention without limiting the same thereto.

EXAMPLE I

A series of coating compositions were prepared from nitrocellulose (one-fourth sec.—25 percent by weight in a solvent consisting of equal parts by weight toluene and methyl ethyl ketone), dimeryl isocyanate, ketimine blocked polyamine derivative, dibutyl tin dilaurate and solvent (consisting of 20 percent Cellosolve acetate, 40 percent butyl acetate and 40 percent toluene, said percentages being by weight). The compositions were prepared by adding the solvent to the nitrocellulose followed by addition of the derivative (when used), mixing, addition of the dimeryl isocyanate (when used) and the dibutyl tin dilaurate and mixing. The compositions were applied as 10 mil wet films (2 mil when dry) with a doctor blade to phosphatized steel panels. The coatings were allowed to cure for 7 days under ambient conditions (approximately 75° F. and humidity averaging about 50 percent) and were then tested for forward and reverse impact (Gardner). The various compositions are identified in the following Table which also sets forth the test results.

reduces impact resistance). Additionally, in such ratios as well as the various other ratios, the presence of the ketimine derivative reduces the induction period. Thus compositions containing both the dimeryl isocyanate and ketimine derivative can be mixed with the nitrocellulose solution and applied immediately to the substrate to yield clear coatings. In contrast, when the dimeryl isocyanate alone is used with the nitrocellulose solution, an induction period of 1 to several hours is required in order to obtain a clear coating. If applied sooner, the coating is hazy due possibly to incompatibility problems.

EXAMPLE II

A composition was prepared from 28 parts 25 percent nitrocellulose as used in example I, three parts dimeryl isocyanate, one part ketimine derivative, 0.07 parts dibutyl tin dilaurate and 56 parts solvent as used in example I. No induction period was required although the composition was allowed to stand for 15 minutes prior to being cast on panels of glass, black plate, wood (maple) and phosphatized steel as 15 mil wet films. The films were allowed to cure for 8 days at ambient conditions as in example I. The coatings were then subjected to various tests, the results being set forth in the following table.

TABLE 1

| Coating [1] | Components (parts by weight) | | | | | Impact (in./lb.) | |
|---|---|---|---|---|---|---|---|
| | Nitro-cellu-lose | Ketimine deriv-ative | Dimeryl isocya-nate | Dibutyl tin di-laurate | Solvent | Forward | Reverse |
| 1 | 28.0 | | | 0.07 | 7.0 | 32-36 | 48-52 |
| 2 | 28.0 | 0.5 | | 0.07 | 9.0 | [2] 4-8 [3] 24-28 | 16-20 |
| 3 | 28.0 | 1.0 | | 0.07 | 11.0 | [2] 4-8 [3] 16-20 | 16-20 |
| 4 | 28.0 | 1.5 | | 0.07 | 13.0 | 20-24 | 4-8 |
| 5 | 28.0 | 2.0 | | 0.07 | 15.0 | 8-12 | <4 |
| 6 | 28.0 | 2.5 | | 0.07 | 17.0 | 8-12 | <4 |
| 7 | 28.0 | | 1.0 | 0.07 | 11.0 | 44-48 | 28-32 |
| 8 | 28.0 | | 3.0 | 0.07 | 19.0 | [2] 40-44 [3] 44-48 | 44-48 |
| 9 | 28.0 | | 5.0 | 0.07 | 27.0 | 60-64 | 40-44 |
| 10 | 28.0 | | 7.0 | 0.07 | 35.0 | 160+ | 108-112 |
| 11 | 28.0 | | 9.0 | 0.07 | 43.0 | 124-128 | 108-112 |
| 12 | 28.0 | 0.5 | 1.0 | 0.07 | 13.0 | 40-44 | 44-48 |
| 13 | 28.0 | 1.0 | 1.0 | 0.07 | 15.0 | [4] | |
| 14 | 28.0 | 1.5 | 1.0 | 0.07 | 18.1 | [4] | |
| 15 | 28.0 | 2.0 | 1.0 | 0.07 | 19.0 | 36-40 | 20-24 |
| 16 | 28.0 | 0.5 | 3.0 | 0.07 | 21.0 | 56-60 | 76-80 |
| 17 | 28.0 | 1.0 | 3.0 | 0.07 | 23.0 | 76-80 | 72-76 |
| 18 | 28.0 | 1.5 | 3.0 | 0.07 | 25.0 | 76-80 | 76-80 |
| 19 | 28.0 | 2.0 | 3.0 | 0.07 | 27.0 | 160+ | 88-92 |
| 20 | 28.0 | 0.5 | 5.0 | 0.07 | 29.0 | 100-104 | 68-72 |
| 21 | 28.0 | 1.0 | 5.0 | 0.07 | 31.0 | 92-96 | 68-72 |
| 22 | 28.0 | 1.5 | 5.0 | 0.07 | 33.6 | 112-116 | 88-92 |
| 23 | 28.0 | 2.0 | 5.0 | 0.07 | 35.0 | 160+ | 148-152 |
| 24 | 28.0 | 0.5 | 7.0 | 0.07 | 37.0 | 88-92 | 56-60 |
| 25 | 28.0 | 1.0 | 7.0 | 0.07 | 39.0 | 92-96 | 56-60 |
| 26 | 28.0 | 1.5 | 7.0 | 0.07 | 41.7 | 160+ | 156-160 |
| 27 | 28.0 | 2.0 | 7.0 | 0.07 | 43.0 | 160+ | 132-136 |

[1] All coating compositions approximately 20% total solids. Compositions were allowed to stand for one hour (induction period) unless viscosity increased too much.
[2] Loss of adhesion.
[3] Film broke.
[4] Composition gelled after 55 minutes and thus was not applied to the substrate.

The above data show that when using between about one and five parts of the dimeryl isocyanate in combination with from 0.5 to 2.0 parts of the ketimine derivative, results are higher than could be expected using either component alone with the nitrocellulose (the ketimine derivative alone actually

TABLE 2

| | |
|---|---|
| Pencil Hardness [1] | 4B |
| Sward Hardness [1] | 22 |
| G. E. Extensibility % [2] | 60+ |

TABLE 2—Continued

| | |
|---|---|
| Reverse Impact (in.-lb.)[3] | 70—80 |
| Forward Impact (in.-lb.)[3] | 100—120 |
| Taber Abrasion (1000 cycles, CS-10)[3] | 61 |
| Gloss (60°)[1] | 76 |
| Solvent Resistance (24 hours) | |
| Initial pencil (cut hardness) | B |
| Water[1] | 5B |
| Sat. ZnCl$_2$[1] | 5B |
| 37% H$_2$SO$_4$[1] | 6B |
| 20% NaOH[1] | <7B |
| Cottonseed oil[1] | 6B |
| Absolute ethanol[3] | <7B |
| Cellosolve acetate[3] | <7B |

[1] Coating on glass

[2] Coating on black plate

[3] Coating on phosphatized steel

[4] Coating on wood

The above data further show the fine properties of the coatings of the present invention.

EXAMPLES III AND IV

Coatings were also prepared in essentially the same manner as set forth in example II except that N,N',N''-tri(4-methyl-2-pentylidene)tris(2-aminoethyl)amine—the triketimine prepared from methyl isobutyl ketone and tris(2-aminoethyl)amine—and N,N'-di(4-methyl-2-pentylidene)hexamethylenediamine— the diketimine prepared from methyl isobutyl ketone and hexamethylenediamine— were used in place of the ketimine derivative. Both of such compounds promoted cross-linking and thus the coatings had improved solvent resistance over coatings prepared from the dimeryl isocyanate alone. Additionally, the induction period was reduced, especially with the first such ketimine.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. A process of coating a substrate which comprises: (1) applying to such substrate a coating of a composition consisting essentially of (A) nitrocellulose, (B) 5.0 to 100 percent by weight based on the weight of the nitrocellulose of a polyisocyanate of the formula

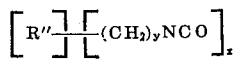

wherein y is 0 or 1, x is an integer of 2 to about 4 and R'' is the hydrocarbon group of polymeric fat acids prepared by polymerizing ethylenically unsaturated monobasic carboxylic acids having 16 to 22 carbon atoms, (C) 2.0 to 30 percent by weight based on the weight of the nitrocellulose of an aldimine or ketimine blocked aliphatic polyamine free of unreacted secondary amine groups such that the amount of such component (C) is equal to or less than would be required to react fully with the polyisocyanate (B) upon the unblocking of the primary amine groups thereof and (D) an organic solvent in an amount such that the composition contains a total of about 5 to 30 percent by weight of components (A), (B) and (C); and (2) curing the composition to thereby obtain an impact resistant coating.

2. The process of claim 1 wherein the composition also contains about 0.5 to 10.0 percent weight based on the weight of the nitrocellulose (A) of (E) a urethane catalyst.

3. The process of claim 1 wherein x is 2 and y is 1.

4. The process of claim 3 wherein the aldimine or ketimine blocked polyamine (C) is N,N',N''-tri(4-methyl-2-pentylidene)tris(2-aminoethyl)amine.

5. The process of claim 3 wherein the aldimine or ketimine blocked polyamine (C) is N,N'-di(4-methyl-2-pentylidene) hexamethylene diamine.

6. The process of claim 3 wherein the aldimine or ketimine blocked polyamine (C) is a compound of the formula

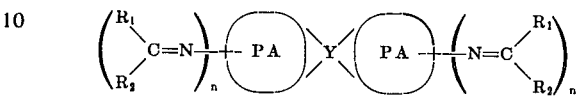

wherein R$_1$ and R$_2$ are hydrogen or organic radicals and wherein at least one of the same must be an organic radical, n is an integer of at least 2,

is the residue of a polyamine exclusive of the ketimine or aldimine blocked primary amine groups and the urea linked secondary amine nitrogen, and

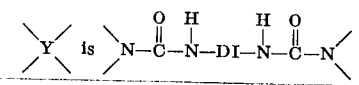

wherein DI is the residue of a diisocyanate exclusive of the isocyanato groups.

7. The process of claim 6 wherein n is 2, R$_1$ and R$_2$ are alkyl groups of one to six carbon atoms, the polyamine is a dialkylene triamine wherein the alkylene groups contain two to six carbon atoms and DI is the divalent hydrocarbon group of dimerized fat acids prepared by polymerizing ethylenically unsaturated monobasic carboxylic acids having 16 to 22 carbon atoms.

8. The process of claim 7 wherein the curing (2) is carried out at ambient room temperature.

9. The process of claim 2 wherein the substrate is phosphatized steel, the polyisocyanate (B) is present in the composition in an amount of about 40 to 100 percent by weight based on the weight of the nitrocellulose (A), the aldimine or ketimine blocked polyamine (C) is present in an amount of about 10 to 25 percent by weight based on the weight of the nitrocellulose (A), the polyisocyanate (B) has the formula

OCH—CH$_2$—D—CH$_2$—NCO and the aldimine or ketimine blocked polyamine (C) has the formula

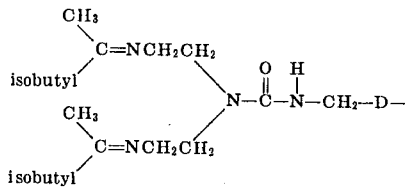

wherein D is the divalent hydrocarbon radical of the dimerized fat acids obtained by polymerizing the mixture of fat acids derived from tall oil composed of approximately 40–45 percent by weight linoleic acids and 50–55 percent by weight oleic acid, the catalyst (E) is dibutyl tin dilaurate, the solvent (D) is a mixture of Cellosolve acetate, butyl acetate and toluene and the curing (2) is carried out at ambient room temperature.

10. The coated substrate having an impact resistant coating prepared by the process of claim 1.

11. The coated substrate having an impact resistant coating prepared by the process of claim 9.

* * * * *

UNITED STATES PATENT OFFICE
CERTIFICATE OF CORRECTION

Patent No. 3,629,013      Dated Dec. 21, 1971

Inventor(s) Kenneth B. Stokes

It is certified that error appears in the above-identified patent and that said Letters Patent are hereby corrected as shown below:

Column 1, line 55, "3D(COOH)$_2$cyz2PCl$_3$" should read -- 3D(COOH)$_2$ + 2PCl$_3$ --; line 69, "D(COOH)$_2$+c2NH$_3$" should read -- D(COOH)$_2$ + 2NH$_3$ --; line 72, "D(CN)$_2$+H$_2$" should read -- D(CN)$_2$+4H$_2$ -- and "D(CH$_2$NH)$_2$" should read -- D(CH$_2$NH$_2$)$_2$ --. Column 3, line 53, after "for" insert -- $>$N-H --. Column 4, line 8, "tris(2,2'''-isocyanatoethyl" should read -- tris(2,2',2"-isocyanatoethyl --. Column 6, line 48, "(25° to" should read -- (25°C.) to --; line 59, "OCH-CH-D-CH$_2$-NCO" should read -- OCN-CH$_2$-D-CH$_2$-NCO --; lines 68-75, the entire formula should read

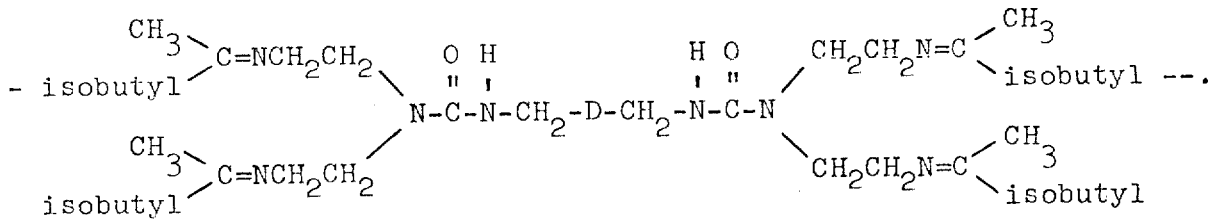

Column 7, in Table I, under the heading "Reverse", for Coating No. 26, "156-169" should read -- 156-160 --; line 64, after "after" insert -- about --.. Column 10, lines 53-60, the entire formula should read

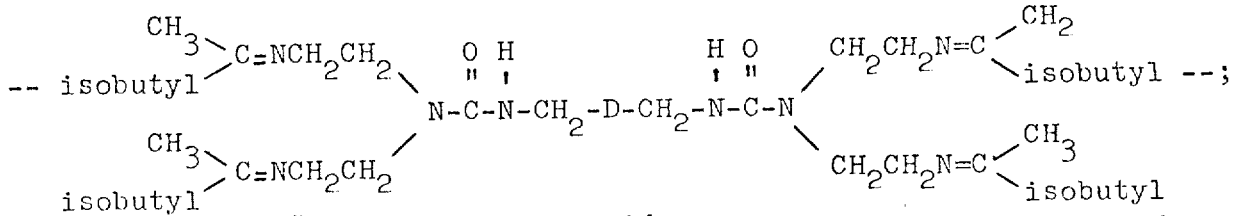

line 66, "acids" should read -- acid --.

Signed and sealed this 6th day of June 1972.

(SEAL)
Attest:

EDWARD M. FLETCHER, JR.
Attesting Officer

ROBERT GOTTSCHALK
Commissioner of Patents